US008688168B2

(12) United States Patent
Elter et al.

(10) Patent No.: US 8,688,168 B2
(45) Date of Patent: Apr. 1, 2014

(54) COMMUNICATION PROTOCOL BETWEEN MOBILE CLIENT AND DOCKING STATION (75) Inventors: James Elter, Flemington, NJ (US); Mauricio Andrada, South Plainfield, NJ (US)

(73) Assignees: Cellco Partnership, Basking Ridge, NJ (US); Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/407,605

(22) Filed: Feb. 28, 2012

(65) Prior Publication Data

US 2013/0225233 A1   Aug. 29, 2013

(51) Int. Cl.
*H04M 1/00*   (2006.01)
*H04W 4/00*   (2009.01)
*H04B 7/00*   (2006.01)
*H04B 1/00*   (2006.01)
*G06F 21/00*   (2013.01)

(52) U.S. Cl.
USPC ............... 455/552.1; 455/432.1; 455/556.1; 455/41.2; 455/575.1; 379/110.01; 705/50

(58) Field of Classification Search
USPC ................................................. 455/552.1
See application file for complete search history.

(56) References Cited

U.S. PATENT DOCUMENTS

| 2002/0172336 | A1* | 11/2002 | Postma et al. | 379/110.01 |
| 2003/0149666 | A1* | 8/2003 | Davies | 705/50 |
| 2005/0143016 | A1* | 6/2005 | Becker et al. | 455/74 |
| 2005/0143149 | A1* | 6/2005 | Becker et al. | 455/575.1 |
| 2009/0175434 | A1* | 7/2009 | Becker | 379/220.01 |
| 2011/0053643 | A1* | 3/2011 | Shmunis | 455/556.1 |
| 2011/0300900 | A1* | 12/2011 | Fleming et al. | 455/555 |
| 2012/0225622 | A1* | 9/2012 | Kudrna et al. | 455/41.2 |

* cited by examiner

*Primary Examiner* — Timothy Pham (57) ABSTRACT

A system is disclosed including a docking mechanism and mobile device having a resident client application are used to establish a network connection between the mobile device and a local area network such as an enterprise Private Branch Exchange (PBX). Once docked, the client application, a mobile unified communication integrated dialer (MUCID), is able to be used to select between carrying a communications call over a land line (through the PBX system) or a mobile telephone line (through a cellular communication network). User mobility is provided by allowing a docked mobile device to be undocked after transfer of an active call being carried over the PBX onto the mobile device. Communications protocols are provided between the MUCID and the docking station.

22 Claims, 6 Drawing Sheets

COMMUNICATION PROTOCOL BETWEEN MOBILE CLIENT AND DOCKING STATION

BACKGROUND

In recent years, mobile communications devices or "cell phones" have become "must have" devices for most people, in many countries. The communications that such devices offer, via wireless mobile communications network, enable users to talk and exchange various types of messages for business and personal reasons and to access information, all from or while traveling through any location where a network provides service. The development of so called smart phones, which offer increased connectivity and computational functionality, has only made mobile communications devices more personal and indispensable to users, who commonly carry their smart phones where ever they go, including to work.

Often work environments utilize a private branch exchange (PBX) system to make connections among their internal telephone lines and connect the internal lines to a public switched telephone network (PSTN). A PBX system often includes extensions to other devices such as fax machines, modems, etc. Further, many PBX systems include extensions to mobile devices (e.g., cellular phones, smart phones, etc.). The PBX extension to mobile devices allows the users to use their mobile devices as virtual extensions of the PBX and benefit from the features of PBX, such as single number reachability (SNR) and simultaneous ringing. In some situations, however, a user may not be able to concurrently utilize data and voice services on a personal mobile device, or such concurrent usage may prove to be cost prohibitive to the user.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF PREFERRED EMBODIMENTS

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

The various preferred embodiments disclosed herein relate to telephony systems, networks, software, methods, and computer readable storage media useful to facilitate transferring services from a local area network to a mobile communications device (also referenced as a "mobile station" or "smart phone") having a resident mobile universal connection (UC) client and by use of a docking station having corresponding software. Certain embodiments relate to a system that includes a docking station and a mobile UC client resident on a mobile communications device. The docking station establishes a network connection among a mobile communications device and a data network such as an enterprise Private Branch Exchange (PBX).

Reference now is made in detail to the examples illustrated in the accompanying drawings and discussed below.

Figure 1:
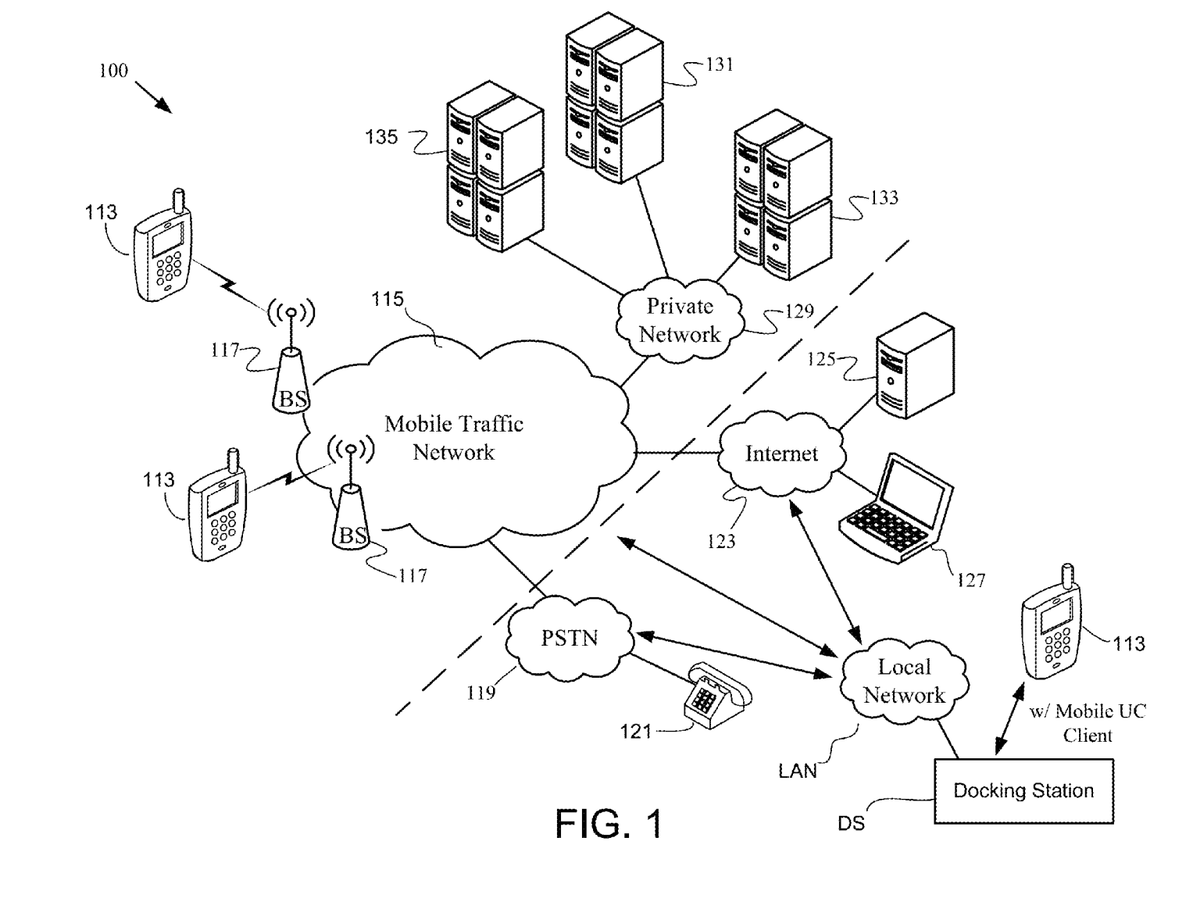
FIG. 1 is a high-level functional block diagram of an example of a system of networks/devices that provide various communications for mobile communications devices and support an example of transferring services from a local area network to a smart phone as facilitated by a mobile unified communication client (mobile UC Client) resident on the smart phone and by use of a docking station.

FIG. 1 is a high-level functional block diagram of an example of a system 100 of networks/devices that provide various communications for mobile communications devices and support an example of transferring services from a local area network to a mobile communications device such as a smart phone by use of a docking station and a mobile UC client resident on the mobile communications device. The example shows simply two mobile communications devices 113 connected to a mobile communication network 115 and a third with a mobile UC client is also connected to a docking station (DS). The mobile devices 113 are examples of mobile communications devices that, when configured with a mobile UC Client, may receive services from a local area network LAN (e.g., a private branch exchange (PBX) of an enterprise) by use of docking station DS, examples of which are described in further detail below and in relation to the other drawing figures. However, the network 115 provides similar communications for many other users as well as for mobile devices/users that do not receive services from a local area network LAN. The network 115 provides mobile wireless communications services to those stations as well as to other mobile communications devices (not shown), for example, via a number of base stations (BSs) 117. The present techniques may be implemented in any of a variety of available mobile networks 115, local area networks LANs (e.g., private branch exchanges including legacy PBXs and IP PBXs), and the drawing shows only a very simplified example of a few relevant elements of the network 115 for purposes of discussion here.

The wireless mobile communication network 115 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile communications devices 113 are capable of voice telephone communications through the network 115, and for the receiving and processing data services. Mobile communications devices 113 can take the form of portable handsets, smart-phones or personal digital assistants, although they may be implemented in other form factors. Exemplary embodiments include mobile communications devices using a Linux-based operating system, such as the Android operating system (developed by the Open Handset Alliance led by Google.)

The network 115 allows users of the mobile communications devices such as 113 (and other mobile communications devices not shown) to initiate and receive telephone calls to each other as well as through the public switched telephone network or "PSTN" 119 and telephone stations 121 connected to the PSTN. The network 115 typically offers a variety of data services via the Internet 123, such as downloads, web browsing, email, etc. By way of example, the drawing shows a laptop PC type user terminal 127 as well as a server 125 connected to the Internet 123; and the data services for the mobile communications devices 113 via the Internet 123 may be with devices like those shown at 125 and 127 as well as with a variety of other types of devices or systems capable of data communications through various interconnected networks. The mobile communication network 115 can be implemented by a number of interconnected networks. Hence, the overall network 115 may include a number of radio access networks (RANs), as well as regional ground networks interconnecting a number of RANs and a wide area network (WAN) interconnecting the regional ground networks to core network elements. A regional portion of the network 115, such as that serving mobile communications devices 113, can include one or more RANs and a regional circuit and/or packet switched network and associated signaling network facilities.

Physical elements of a RAN operated by one of the mobile service providers or carriers, include a number of base stations represented in the example by the base stations (BSs) 117. Although not separately shown, such a base station 117 can include a base transceiver system (BTS), which can communicate via an antennae system at the site of base station and over the airlink with one or more of the mobile communications devices 113, when the mobile communications devices are within range. Each base station can include a BTS coupled to several antennae mounted on a radio tower within a coverage area often referred to as a "cell." The BTS is the part of the radio network that sends and receives RF signals to/from the mobile communications devices 113 that are served by the base station 117.

The radio access networks can also include a traffic network represented generally by the cloud at 115, which carries the user communications and data for the mobile communications devices 113 between the base stations 117 and other elements with or through which the mobile communications devices communicate. The network can also include other elements that support functionality other than device-to-device media transfer services such as messaging service messages and voice communications. Specific elements of the network 115 for carrying the voice and data traffic and for controlling various aspects of the calls or sessions through the network 115 are omitted here form simplicity.

The carrier will also operate a number of systems that provide ancillary functions in support of the communications services and/or application services provided through the network 115, and those elements communicate with other nodes or elements of the network 115 via one or more private IP type packet data networks 129 (sometimes referred to as an Intranet), i.e., a private network. Generally, such systems are part of or connected for communication via the private network 129. Systems outside of the private network may, however, serve the same functions as well. Examples of such systems, in this case operated by the network service provider as part of the overall network 115, which communicate through the intranet type network 129, include one or more application servers 131 and a related authentication server 133 for the application service of server 131. A mobile communications device 113 communicates over the air with a base station 117 and through the traffic network 115 for various voice and data communications, e.g. through the Internet 123 with a server 125 and/or with application servers 131-135. Servers such as 125 and 131-135 may provide any of a variety of common application or service functions (e.g., authentication, provisioning, etc.) in support of or in addition to an application program running on the mobile communications device 113.

Figure 2:
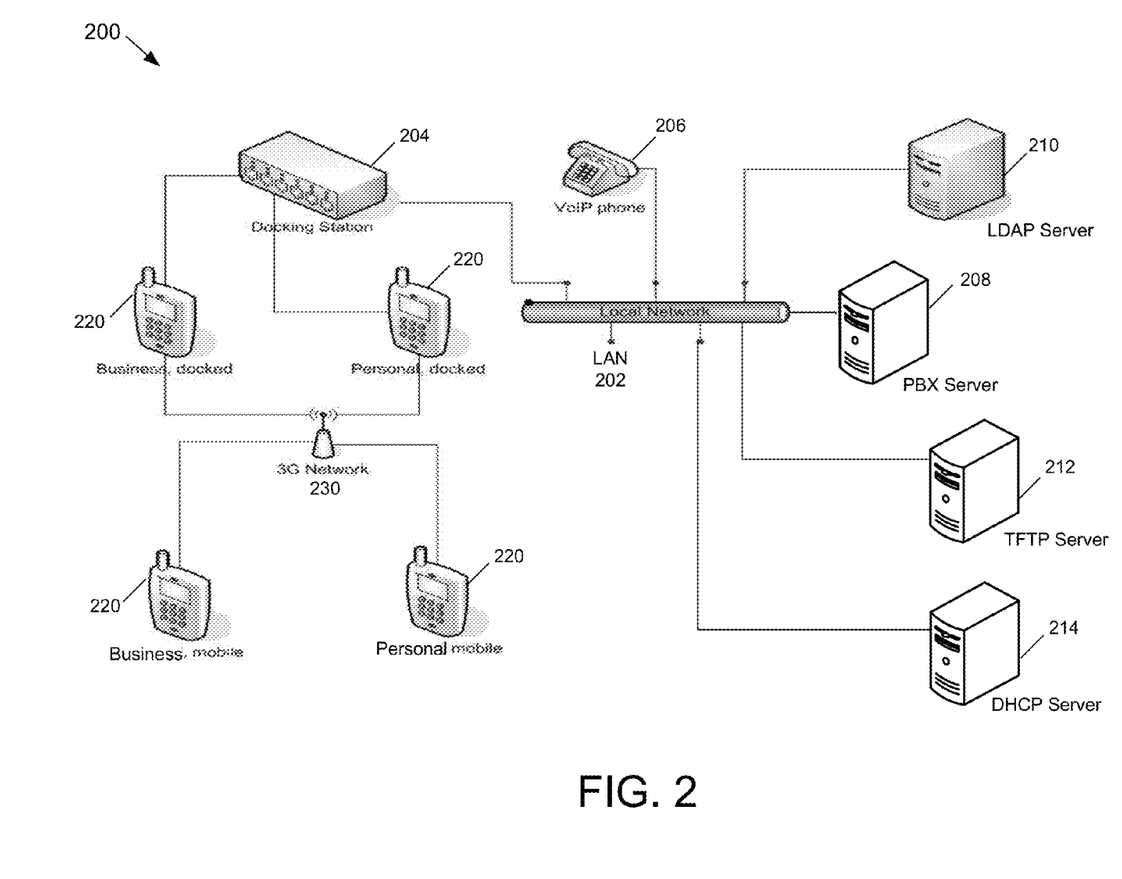
FIG. 2 is a high-level functional block diagram of an example of a local area network utilizing a docking station to provide transferring services to a smart phone having a mobile UC Client as shown in FIG. 1.

FIG. 2 is a high-level functional block diagram of an example a system 200 of networks/devices including a local network (LAN) 202 utilizing a docking station 204 to transfer data services to a mobile communications device 220 (e.g., a smart phone) having a mobile UC client like that shown in FIG. 1.

As illustrated in FIG. 2, a local network (LAN) 202 of an enterprise (e.g., business, home, etc.) includes a PBX (e.g., a voice over Internet Protocol (VoIP) PBX, SIP IP PBX, or a legacy PBX) indicated by PBX server 208. LAN 202 is connected to a docking station 204. Local network (LAN) 202 (e.g., as indicated by LAN in FIG. 1) can connect to a Public Switched Telephone Network (PSTN) 185 and/or the Internet 190. The elements within LAN 202 include, but are not limited to, VoIP phone 206, light weight directory access control (LDAP) services as indicated by LDAP server 210, trivial file transfer protocol (TFTP) services as indicated by TFTP server 212, and/or dynamic host configuration protocol (DHCP) services as indicated by DHCP server 214. LAN 202 may also include configuration resources (e.g., corporate voice mail, simple network management protocol (SNMP), active directory (AD), etc.), and/or other elements (PBX Extension Devices) such as fax machines, telephones, and modems (not shown). The elements connected using a PBX server 208 are generally referred to as "extensions." These elements may be connected to the PBX server 208 via LAN 202.

Figure 7A:
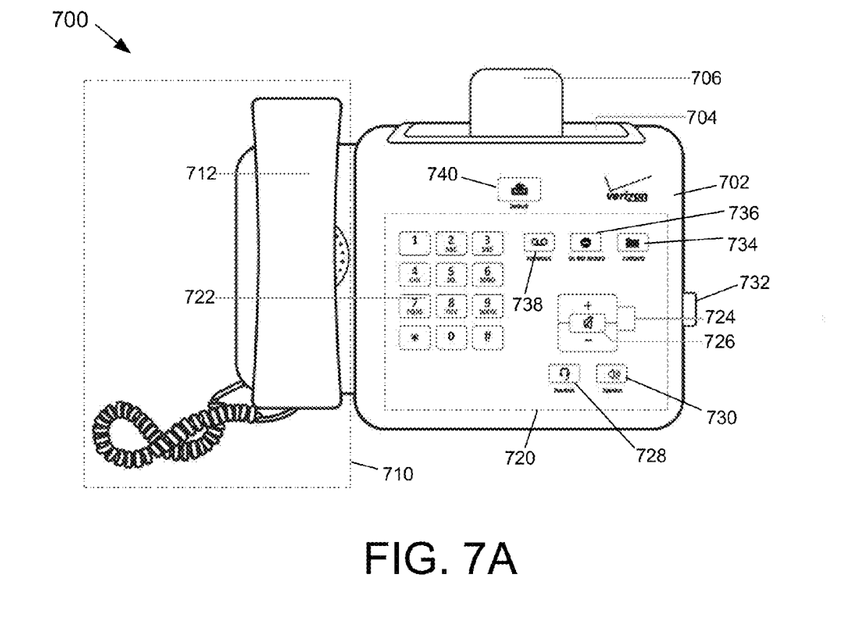
FIG. 7A depicts a front view of an example of a docking station.
Figure 7B:
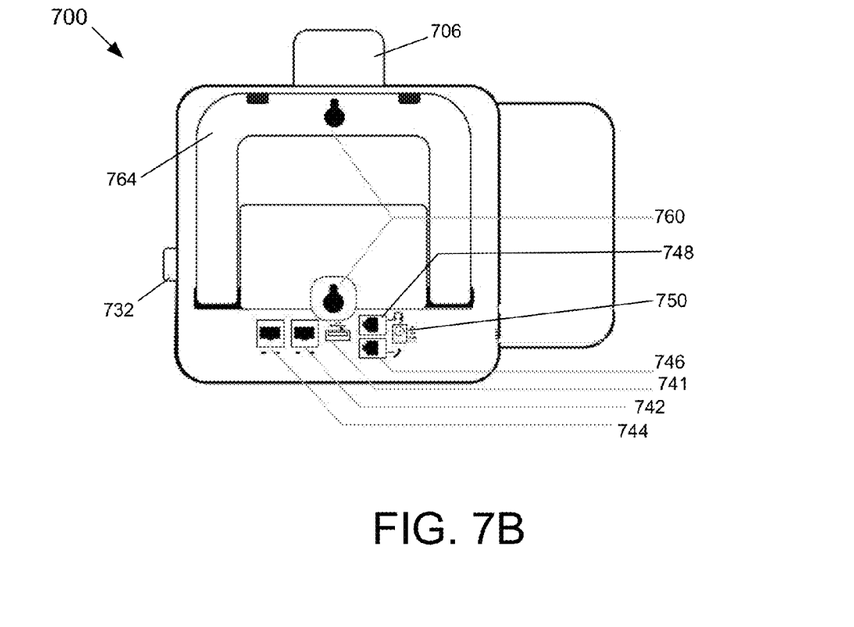
FIG. 7B depicts a rear view of the docking station of FIG. 7A.

The docking station 204 is used to establish a network connection between a mobile communications device 220 and the PBX server 208 via the local network 202. The docking station 204 includes a physical interface (e.g., a Universal Serial Bus (USB) connection) and software that together are used to connect a mobile communications device 220 having a resident mobile UC client (also referred to as a mobile UC integrated dialer (ID) client) to the PBX server 208 via the local network 202. In some embodiments, a docking station 204 can include a portion (e.g., a cradle or receiving aperture)

that is adapted securely hold a mobile communications device 220, such as shown and described for FIGS. 7A-7B.

As further shown in FIG. 2, a mobile communications device 220 can be utilized in different states or modes of use: docked or un-docked, and, enterprise or personal. In an "Enterprise Mode," the mobile communications device handles calls that have been anchored on PBX in docked state. The call is handled by the mobile UC Integrated Dialer (MUCID) client on the device. Calls handled in this mode are Enterprise Calls. In "Personal Mode," the mobile communications device handles calls that have come directly from the wireless network (e.g., 3G network(s)). In this mode the phone call is handled by the native voice client on the device and not the mobile UCID client. The calls handled in this state are called Personal Calls. In the "un-Docked State," the mobile device uses the cellular network for communications. In the "Docked State," the mobile device is docked on the cradle of the docking station and the communication is enabled on the local network (e.g., enterprise Ethernet) infrastructure and a PBX SIP stack of the MUCID is utilized for call control.

Once connected to the local network LAN (including PBX server 208), enterprise services (e.g., such as Ethernet connectivity when docked and cellular connectivity when undocked, VOIP when docked, access to enterprise visual voicemail, viewing of enterprise call logs, access to corporate directory, etc.) can be provided to the mobile communications device 220.

Figure 3:
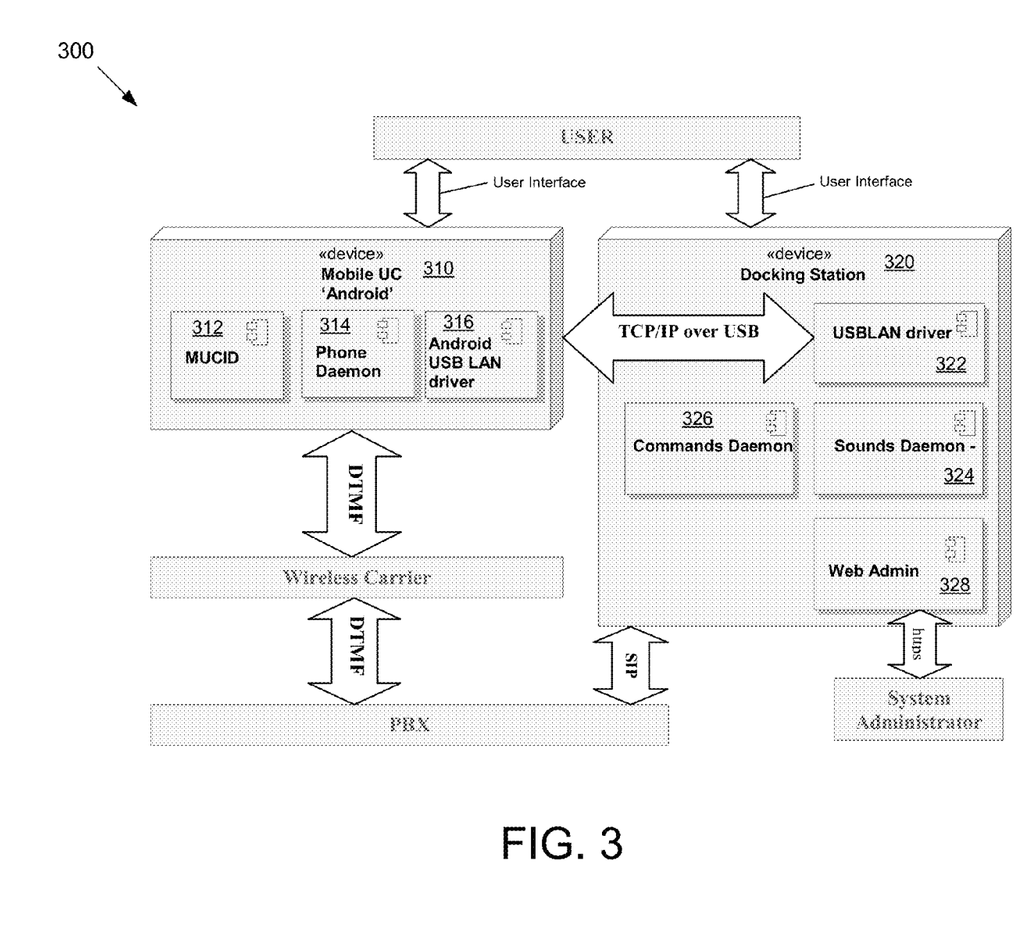
FIG. 3 is a functional block diagram of an example of software modules of a docking station and mobile UC Client used with a smart phone like that shown in FIG. 2.

FIG. 3 is a functional block diagram 300 of an example of software modules of a docking station and mobile UC client used with a mobile device such as 220 shown in FIG. 2. The mobile UC client 310, also referenced herein as an integrated dialer client application, includes a mobile UC Integrated Dialer (MUCID) 312, which implements the user interface and the main business logic of the mobile UC client application 310. The MUCID 312 interfaces with the docking station 320 using TCP/IP and UDP/IP over a USB connection (shown connected between Android USB LAN Driver 316 and USBLAN driver 322 resident on the docking station 320). The MUCID 312 interfaces with a local network (e.g., an enterprise PBX system) through the wireless phone carrier using dual-tone multi-frequency signaling (DTMF).

The MUCID 312 interfaces with a resident Phone Daemon 314, e.g., using Interprocess communication IPC (as shown Android Interface Definition Language AIDL). The MUCID interfaces with the docking station 320 (e.g., the Commands Daemon 326 in its capacity as a protocol buffer (Protobuf) and the Sounds Daemon 324 for User Datagram Protocol UDP and Pulse Code Modulation PCM raw messages) through TCP/IP over USB. The Phone Daemon 314 as shown in this embodiment is an Android application that can use the existing Phone APIs to access features such as dual tone multi frequency DTMF communications. The USB LAN Driver 316 can be an Android Driver signed by the Mobile UC hardware vendor, and provides the communication layer between the Mobile UC 310 and the docking station 320 in docked mode.

The mobile UC client 310 is preferably signed by the Phone OEM hardware vendor. The public key (e.g., of a public-key cryptosystem such as by RSA) used to sign the Mobile UC client is preferably known and hardcoded in the MUCID Phone service so that the Phone operating system (OS) service grants access only to the Mobile UC client application 310.

In some embodiments, the Mobile UC Integrated Dialer (MUCID) 312 includes four components or functional blocks (not shown): a Universal Dialing User Interface, Mobile Factory Dialer, a Transparent Two-Stage Dialer, and a VoIP Dialer.

The Universal Dialing User Interface is universal interface to assist the user to complete calls on various call scenarios. It provides a consistent user experience and maintains an interface with the same look and feel when calls are made from the mobile device. The Mobile Factory Dialer is native dialer similar to the one provided by manufacture and used as the default dialer for cellular network voice services. The Transparent Two-Stage Dialer is a single-number native dialer that bypasses the two-stage dialing process and allows the mobile device to access Enterprise PBX features when the mobile device is in the un-docked state and uses the cellular network as the primary access method for voice services.

In a two-stage dialing process, to access the Enterprise PBX, the Enterprise Access Number is first dialed at the mobile device, the user/device is authenticated, a dial tone is provided by Enterprise PBX, then a second set of digits for called party is submitted at the mobile device to complete the call. After receiving the second set of digits, the enterprise PBX suspends a first call leg from the mobile device and uses the second set of digits to call the called party. Once the called party answers, the PBX provides a bridge and completes the call so that the mobile device and called party are in communication. The transparent two-stage dialer maintains the single number dialing experience and eliminates the need to first dial the Enterprise Access Number before entering the called party number to complete the call.

The VoIP Dialer is a SIP-compliant dialer that allows an Android-based mobile device, for example, to function and behave as an enterprise desk phone when the mobile device is in the docked state, and use the local network (e.g., enterprise campus) infrastructure as the primary access method for voice services. When docked, the mobile device accesses enterprise voice services via the built-in Ethernet interface of the docking station (also called a cradle). The mobile device can enter a called party number either via a standard dial pad from the cradle or a touch screen from the mobile communications device allowing access to enterprise PBX features similar to a standard enterprise desk phone.

With continued reference to FIG. 3, the docking station 320 includes, in addition to the USBLAN Driver described above, a Commands Daemon 326, which is used to send/receive commands to the Mobile UC client. The actual messages exchanged between the Mobile UC client and the docking station are binary messages. The Commands Daemon 326 interfaces with the Mobile UC client 310 in docked mode by way of the MUCID 312 through TCP/IP over USB.

The docking station 320 also includes a Sounds Daemon 324 that is used to send/receive data streams to the audio devices (speaker, microphone, handset, headset) present in the docking station 320. The audio stream is formatted by the Sounds Daemon 324 accordingly. The Sounds Daemon 324 interfaces with the Mobile UC client 310 in the docked mode by way of the MUCID 312 through TCP/IP and UDP/IP over USB.

Also shown in FIG. 3 is an optional web administration module (Web Admin) 328 that may be used to provide a user interface for configuration of the docking station 320. The Web Admin 328 can be implemented as web based application on the docking station 320. The Web Admin 328 can interface with the docking station Commands Daemon 326, e.g., through named Linux request and response pipes.

Figure 4:
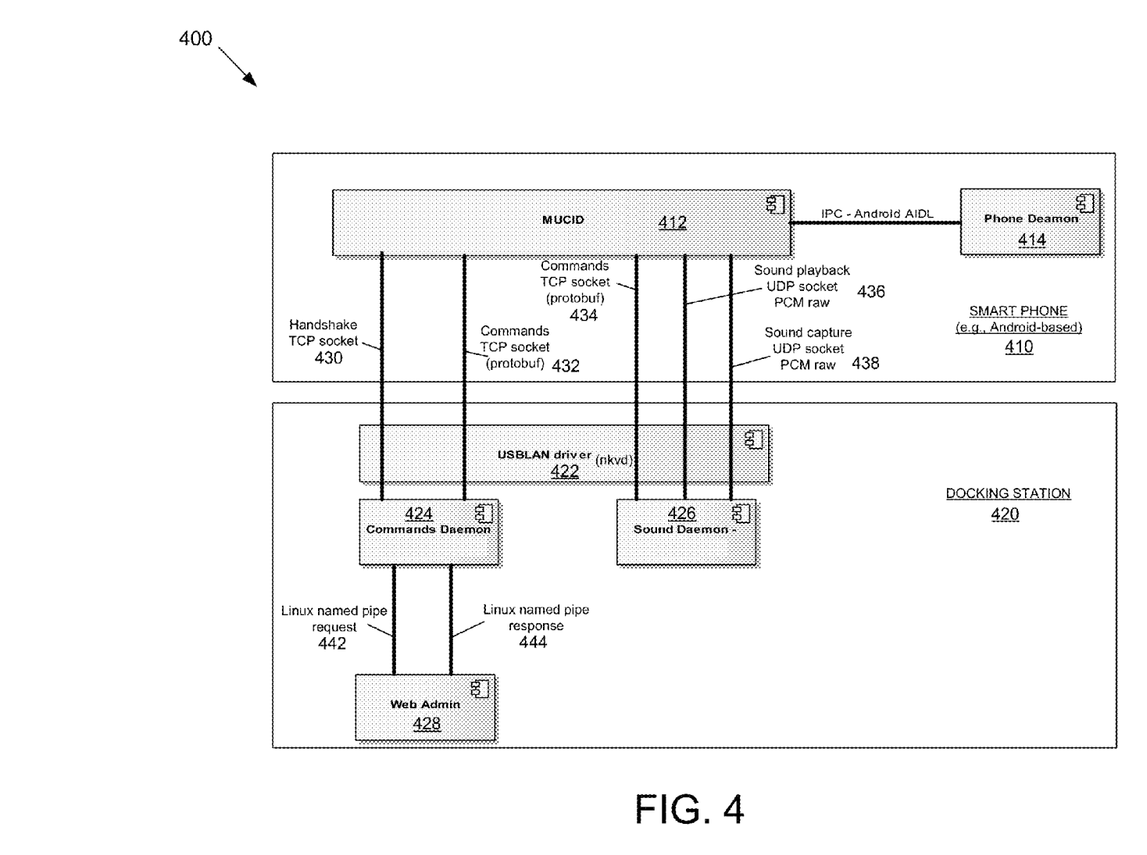
FIG. 4 is a functional block diagram of an example of communication among software modules of a docking station and mobile UC Client used with a smart phone.

FIG. 4 is a functional block diagram 400 of an example of communication, including socket connections, among software modules of a docking station and a smart phone 410 having a resident mobile UC Client, or mobile UC integrated dialer (MUCID) 412. The MUCID 412 interfaces with the docking station software modules 420 using TCP/IP and UDP/IP over USB and USB LAN driver 422 (e.g., as indicated by TCP and UDP sockets 430-438 with the Commands Daemon 424 and Sound Daemon 426, respectively). The MUCID also interfaces with the enterprise PBX system through the wireless phone carrier using DTMF by way of the Phone Daemon 414 using IPC (AIDL), as shown. The Phone Daemon 414 has already been described above. A Handshake TCP socket 430 and a Commands TCP socket 432, acting as a protocol buffer (protobuf) are established between the MUCID 412 and the Commands Daemon 424 over the USB LAN driver (e.g., nkvd) 422. A Commands TCP socket 433, acting as a protocol buffer is established between the MUCID 412 and the Sound Daemon 426 over the USB LAN driver 422. A Sound playback UDP socket 436 and a Sound capture UDP socket 438, for UDP raw messages, are established between the MUCID 412 and the Sound Daemon 426 over the USB LAN driver 422.

The Android Driver is signed by the Phone OEM hardware vendor and provides the communication layer between the mobile UC client and the docking station in docked mode. The mobile UC client is preferably signed by the application developer. The public key used to sign the Mobile UC client is preferably known and hardcoded in the MUCID Phone service so that the Phone service grants access only to the Mobile UC client application.

For the docking station 420, the USB LAN driver provides the communication layer between the docking station and the Mobile UC in docked mode. The Commands Daemon 424 is used to send/receive commands to the Mobile UC client. The actual messages exchanged between the Mobile UC client and the docking station are binary messages. The Commands Daemon 424 interfaces with the mobile UC client 412 in docked mode through TCP/IP over USB.

The Sounds Daemon 426 is used to send/receive data streams to the audio devices (speaker, microphone, handset, headset, etc.) present in the docking station 420. The audio stream is be formatted by the Sounds Daemon 426 accordingly. The Sounds Daemon interfaces the Mobile UCID 412 in docked mode through TCP/IP and UDP/IP over USB.

Also shown in FIG. 4 is an optional web administration module (Web Admin) 428 that may be used to provide user interface for configuration of the docking station 420. The (Web Admin) 428 can be implemented as web based application on the docking station 420, and the example shown interfaces the docking station Commands Daemon 424 through Linux named request and response pipes 442-444.

Figure 5:
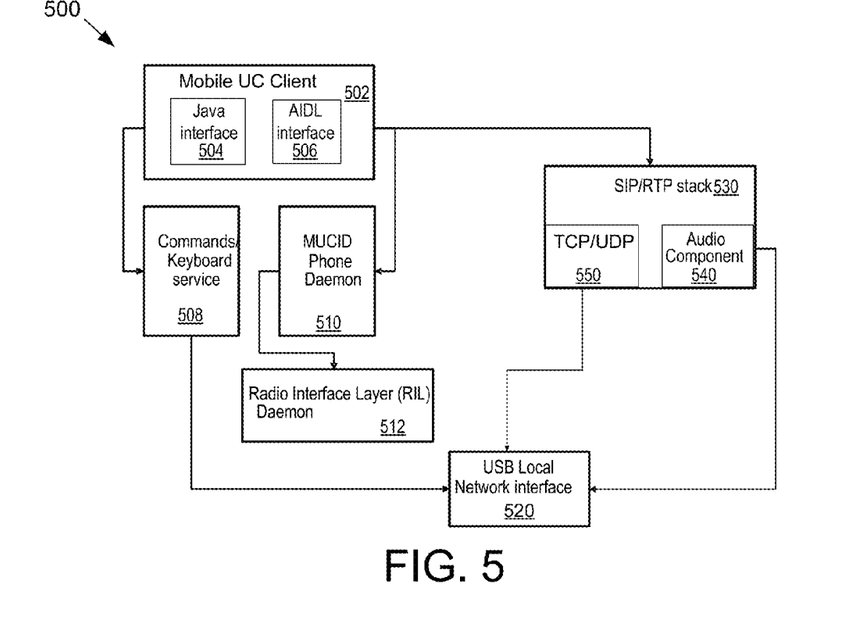
FIG. 5 is a functional block diagram of an example of software modules of a mobile UC Client used with a smart phone like those shown in FIG. 3.

FIG. 5 is a high-level block diagram 500 of a mobile UC Integrated Dialer (MUCID) application 502 that is installed in a mobile device (shown in various states in FIG. 2 and collectively referenced hereinafter using reference numerical 220) used with embodiments disclosed herein. Through Java and AIDL interfaces, 504 and 506, respectively, application 502 implements the commands/keypad service 508 and audio component 510 that are responsible for communication with the enterprise PBX 208 through a local network interface 520, e.g., as provided via the docking station 204 (FIG. 2). Specifically, the commands/keypad service 508 implements communications protocols that are used to communicate with the enterprise PBX server 208 through the docking station 204 and the local network 202 (FIG. 2). For example, these communications protocols implement the commands for establishing an initial handshake between the mobile device 220 and the docking station 104, controlling keyboard events, controlling a light emitting diode (LED), and providing application level functions (e.g., Trivial File Transfer Protocol (TFTP) download, single network management protocol (SNMP) download, SNMP values exchange, network time protocol (NTP), etc.) on the mobile device 220.

The audio component 540 is responsible for handling of the bi-directional audio data stream to and from the docking station 204 (FIG. 2). The audio component 540 is implemented as a part of a media stack 530 and is arranged to communicate with an Audio Daemon (not shown) on the docking station 204 (FIG. 2) through the local network interface 320.

The MUCID Phone Daemon 510 is responsible for the interface with a Radio Interface Layer (RIL) daemon 512 that provides the mobile device 202 with various functionalities (e.g., sending Dual Tone Multi Frequency (DTMF) and other cellular call control functions). The MUCID Phone Daemon 510 is signed by its original equipment manufacturer (OEM) and is pre-loaded onto the mobile device 220. The RIL daemon 512 is a software interface that is used in providing communications among the mobile device 220 (FIG. 2) and cellular/wireless networks 115 (FIG. 1). The SIP/Real Time Transport Protocol (RTP) stack 530 connects to enterprise servers when docked and in Enterprise Mode.

Figure 6:
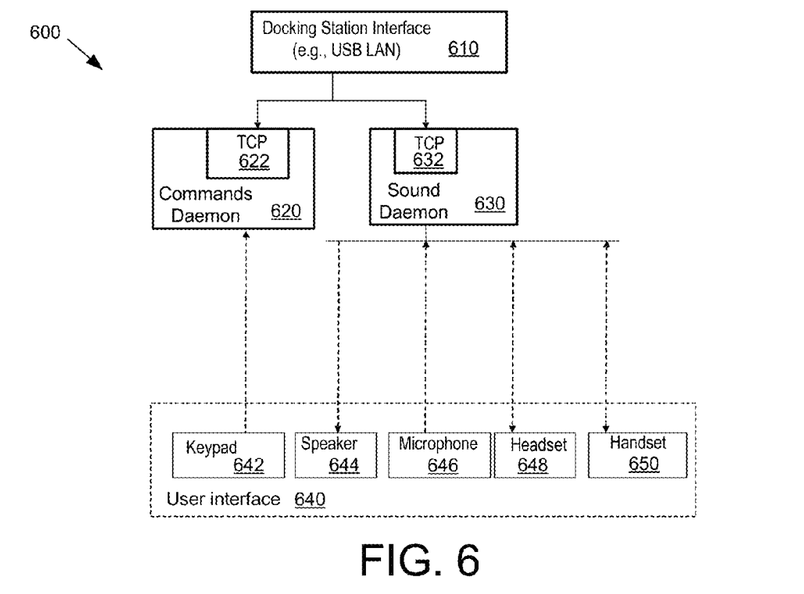
FIG. 6 is a functional block diagram of an example of software modules of software used with a docking station like the one shown in FIG. 3.

FIG. 6 is a block diagram 600 of software modules of docking station 204 (shown in FIG. 2) according to an example embodiment disclosed herein. The docking station includes a docking station interface (e.g., a USB LAN driver), configured to operate with corresponding driver of the MUCID as noted above, which facilitates communication among the docking station 204 and the mobile device 220 while in the docked mode. A commands daemon 620 is used to send/receive commands between the docking station interface 610 and a docking station user interface 640, e.g., from command devices, such as a keypad 642. A sounds daemon 630 is responsible for sending/receiving data streams to the audio devices, such as a speaker 644, a microphone, 646, a headset 648, and a handset 650. In some embodiments, in the docked mode, these audio devices are connected to the enterprise PBX server 208 and provide the mobile device 220 user with access to features of the enterprise PBX server 208.

FIGS. 7A-7B depict front and rear views of an exemplary embodiment of a docking station 700 that can be used to connect a mobile communications device (e.g., 220 of FIG. 2) to a local network (e.g., SIP IP PBX) and transfer services (e.g., data services) to the mobile communications device. Docking station 700 is shown including a housing 702 (e.g., made of a suitable material such as plastic) with a cavity or aperture 704 configured to receive a mobile device (not shown). As was described previously, docking stations such as docking station 700 can connect a mobile communications device to a local network over a USB connection. A USB cable (not shown) can be used to connect a mobile communications device to a corresponding USB connection associated with the docking station, for example, positioned within the cavity or aperture 704. A raised surface or cradle 706 may also be present to facilitate secure holding of the mobile communications device. Docking station 700 can include a handset portion 710 including a handset 712. A touch screen or keypad portion 720 may also be included, which includes a number of pads of keys for user input. Examples includes number keys 722, volume buttons, 724, a mute button 726, an adjustment knob/button 732 (for reclining support stand 764), a "contacts" 734, a "do not disturb" button 736, and a voice-mail button 738. In exemplary embodiments, a button/indicator 740 may present to indicate docking status and to initiate undocking of a mobile communications device from the docking station. The button/indicator 740 may include a lighting feature, e.g., a LED, providing a visual indication of docking status of the mobile communication device (e.g., mobile communications device 220 of FIG. 2) with the docking station 700 (e.g., on/off or different colors depending on the status).

FIG. 7B shows the rear of docking station 700, including a USB jack (or port) 741 such as one suitable to receive one end of a micro-USB smartphone cable; the other end is for the mobile communications device (e.g., Android smart phone) used with the docking station 700. Also shown are Ethernet In and Out ports 742 and 744. Two handset jacks (ports) 746-748 are present, as is a DC power jack (connection) 750. To facilitate mounting on a surface, mounting hooks/apertures 760 may also be provided. As previously noted, adjustable reclining support stand 764 may also be provided.

Aspects of the methods of transferring services such as data services from a local network (e.g., an enterprise PBX) outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement features associated with the transferring of PBX services to a mobile communications device, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Examples: Technical Specifications for Exemplary Embodiments. The attached Appendix 1, which is incorporated in its entirety by reference herein forms a part of this specification, describes examples of technical specifications, also referred to as service requirements, for exemplary embodiments.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
a mobile communications device including:
a mobile unified communications integrated dialer (MUCID) client configured to communicate via Session Initiated Protocol (SIP) and to receive data services from a data network comprising a private branch exchange (PBX) network when connected to the data network, and
a phone daemon configured to provide phone functionality via phone application programming interfaces (APIs) and receive cellular voice services directly from a wireless communications network; and
a docking station configured to establish a connection between the mobile communications device and the data network, wherein the docking station is configured to transfer services from the data network to the mobile communications device when a connection is established between the mobile communications device and the data network, wherein:
the mobile communications device is configured to operate in an enterprise mode and in a personal mode,
in the enterprise mode:
the mobile communications device handles calls using the MUCID client through the established connection with the data network and via the docking station; and
the MUCID client includes a transparent two-stage dialer configured to establish a call between the mobile communications device and a called party when the mobile communications device is not docked on the docking station by dialing an enterprise access number to access the PBX network,
in the personal mode, the mobile communications device handles calls using the phone daemon on the mobile communications device through the wireless communications network without using the data network via the docking station, and
the MUCID client is further configured to use the phone daemon to provide phone functionality via the phone APIs in the enterprise mode.

2. The system of claim 1, wherein the MUCID client is configured to provide a communication layer over the connection with the docking station.

3. The system of claim 1, wherein the connection comprises a Universal Serial Bus (USB) connection.

4. The system of claim 1, wherein the connection comprises an Ethernet connection.

5. The system of claim 1, wherein the connection comprises Transmission Control Protocol (TCP)/Internet Protocol (IP).

6. The system of claim 1, wherein the PBX network comprises a Voice over IP (VoIP) PBX network.

7. The system of claim 1, wherein the mobile communications device is configured to use an Android operating system.

8. The system of claim 1, wherein the MUCID client is signed with a public key of a public-key cryptosystem.

9. The system of claim 1, wherein the enterprise mode and the personal mode can be utilized when the mobile communications device is docked on the docking station.

10. The system of claim 1, wherein the enterprise mode and the personal mode can be utilized when the mobile communications device is not docked on the docking station.

11. The system of claim 1, wherein the MUCID includes a universal dialing user interface, a mobile factory dialer, and a VoIP dialer.

12. The system of claim 11, wherein the transparent two-stage dialer is further configured to:
receive a dial tone from the PBX network; and
submit a called number to the PBX network.

13. A method comprising:
establishing a data connection between a mobile communications device including a mobile unified communications integrated dialer (MUCID) client configured to communicate via Session Initiated Protocol (SIP) and a local area network comprising a private branch exchange (PBX) network using a docking station configured to transfer services from the local area network to the mobile communications device through the established data connection;
over the established data connection and via the docking station, receiving at the mobile communications device data services from the local area network;
in an enterprise mode of the mobile communications device:
handling calls using the MUCID client through the established data connection with the local area network and via the docking station; and
when the mobile communications device is not docked on the docking station, establishing a call between the mobile communications device and a called party using a transparent two-stage dialer by dialing an enterprise access number to access the PBX network; and
in a personal mode of the mobile communications device, handling calls using a phone daemon configured to provide phone functionality via phone application programming interfaces (APIs) on the mobile communication device directly through a wireless communications network different from the local area network without using the docking station, wherein
the MUCID client uses the phone daemon to provide phone functionality via the phone APIs in the enterprise mode.

14. The method of claim 13, further comprising, with the MUCID client, providing a communication layer over the connection with the docking station.

15. The method of claim 13, wherein the MUCID client is configured to provide a communication layer over the connection with the docking station.

16. The method of claim 13, wherein the connection comprises a Universal Serial Bus (USB) connection.

17. The method of claim 13, wherein the connection comprises an Ethernet connection.

18. The method of claim 13, wherein the connection comprises Transmission Control Protocol (TCP)/Internet Protocol (IP).

19. The method of claim 13, wherein the PBX network comprises a Voice over IP (VoIP) PBX network.

20. The method of claim 13, wherein the mobile communications device is configured to use an Android operating system.

21. The method of claim 13, wherein the MUCID is configured to provide a universal dialing user interface, a mobile factory dialer, and a VoIP dialer.

22. The method of claim 21,
wherein establishing the call further comprises:
receiving a dial tone from the PBX network; and
submitting a called number to the PBX network.

* * * * *